(12) United States Patent
Shekhawat et al.

(10) Patent No.: US 9,030,847 B2
(45) Date of Patent: May 12, 2015

(54) INVERTER AND DRIVING METHOD THEREOF

(75) Inventors: Sampat Shekhawat, Jaipur (IN);
Myungbok Kim, Chungnam (KR);
Donghye Cho, Seoul (KR)

(73) Assignee: Fairchild Korea Semiconductor Ltd., Bucheon (KR)

( * ) Notice: Subject to any disclaimer, the term of this patent is extended or adjusted under 35 U.S.C. 154(b) by 882 days.

(21) Appl. No.: 12/884,682

(22) Filed: Sep. 17, 2010

(65) Prior Publication Data

US 2012/0069607 A1 Mar. 22, 2012

(51) Int. Cl.
*H02M 3/335* (2006.01)

(52) U.S. Cl.
CPC ............ *H02M 3/33584* (2013.01); *Y02E 10/56* (2013.01)
USPC .................... 363/21.04; 363/21.12; 363/21.1; 363/21.18

(58) Field of Classification Search
USPC ............ 363/21.04–21.05, 21.07–21.09, 21.1, 363/21.12–21.13, 21.15–21.18
See application file for complete search history.

(56) References Cited

U.S. PATENT DOCUMENTS

| | | | | |
|---|---|---|---|---|
| 5,412,557 A | * | 5/1995 | Lauw | 363/37 |
| 5,815,388 A | * | 9/1998 | Manley et al. | 363/63 |
| 5,978,238 A | * | 11/1999 | Liu | 363/56.09 |
| 5,991,172 A | * | 11/1999 | Jovanovic et al. | 363/21.14 |
| 6,121,768 A | * | 9/2000 | Taurand | 324/117 R |
| 6,307,761 B1 | * | 10/2001 | Nakagawa | 363/65 |
| 7,936,575 B2 | * | 5/2011 | Hu | 363/21.06 |
| 8,023,295 B1 | * | 9/2011 | Shekhawat et al. | 363/56.11 |

FOREIGN PATENT DOCUMENTS

CN 1131357 A 9/1996

OTHER PUBLICATIONS

S. B. Kjaer "Design and Control of an Inverter for Photovoltaic Applications", 2004/2005, 236 pgs., Aalborg University Institute of Energy Technology, Aalborg East, Denmark.

* cited by examiner

*Primary Examiner* — Adolf Berhane
*Assistant Examiner* — Henry Lee, III
(74) *Attorney, Agent, or Firm* — Okamoto & Benedicto LLP

(57) ABSTRACT

An inverter and driving method of the inverter are disclosed. The inverter includes an active clamp forward (ACF) converter and a flyback converter. One of a forwarding operation of delivering current from a primary side to a secondary side by using the ACF converter and a backwarding operation of delivering current from the secondary side to the primary side by using the flyback converter is selected to generate a rectified AC.

26 Claims, 14 Drawing Sheets

US 9,030,847 B2

INVERTER AND DRIVING METHOD THEREOF

BACKGROUND OF THE INVENTION (a) Field of the Invention

The present invention relates to an inverter and a driving method thereof, and more particularly, to an inverter connected to a photovoltaic array so as to be used, and a driving method thereof.

(b) Description of the Related Art

An inverter is a device for converting a direct current (DC) input into an alternating current (AC) output. That is, the inverter converts a DC input into an AC output. In detail, the inverter converts the DC input into a rectified AC and then toggles the rectified AC in units of one period to generate the AC output. Toggling refers to a continuous operation of maintaining the rectified AC as a positive value during one period and inverting it to a negative value during a next period. Hereinafter, the rectified AC will be referred to as a rectified AC. The related art inverter uses a push-pull circuit in order to generate a rectified AC. However, the push-pull circuit operates in a hard-switching manner, causing a lot of switching loss. In order to meet the efficiency required for a photovoltaic (PV) inverter, the switching loss needs to be reduced. The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a high efficiency inverter and a driving method thereof.

An exemplary embodiment of the present invention provides an inverter including: a hybrid converter generating a hybrid output voltage conforming to a rectified AC waveform according to one of a forwarding operation of delivering current from a primary side to a secondary side and a backwarding operation of delivering current from the secondary side to the primary side; a toggle circuit toggling the hybrid output voltage in units of one period of the hybrid output voltage to generate an AC output; and an inverter controller selecting one of the forwarding operation and the backwarding operation according to the hybrid output voltage, controlling a current transmission according to the selected operation, and controlling the operation of the toggle circuit, wherein the hybrid converter includes an active clamp forward (ACF) converter and a flyback converter.

When the ACF converter operates, the inverter may perform the forwarding operation, and when the flyback converter operates, the inverter may perform the backwarding operation. The inverter controller may operate one of the ACF converter and the flyback converter so that the hybrid output voltage comes within a prescribed rectified AC critical range to thus conform to a rectified AC waveform, and the rectified AC critical range may be set based on the rectified AC waveform. A lower limit of the rectified AC critical range may be a waveform obtained by multiplying a first gain to the rectified AC waveform, an upper limit of the rectified AC critical range may be a waveform obtained by multiplying a second gain to the rectified AC waveform, the second gain may be greater than 1, and the first gain may be smaller than 1.

The inverter controller may include a selection unit operating the ACF converter until before the hybrid output voltage, which has been reduced to the lower limit, reaches the upper limit, and operating the flyback converter until before the hybrid output voltage, which has been increased up to the upper limit, reaches the lower limit. The selection unit may include: a first limit comparator comparing the hybrid output voltage and the lower limit and outputting a signal according to the comparison result; a second limit comparator comparing the hybrid output voltage and the upper limit and outputting a signal according to the comparison result; and an SR latch including a set terminal to which an output signal from the first limit comparator is inputted and a reset terminal to which an output signal from the second limit comparator is inputted, outputting a first level signal through a first output terminal upon being synchronized with a first edge inputted to the set terminal, and outputting a second level signal through a second output terminal upon being synchronized with a second edge inputted to the reset terminal, wherein a forwarding signal of an enable level for operating the ACF converter is generated according to the first level signal, and a backwarding signal of an enable level for operating the flyback converter is generated according to the second level signal.

The selection unit may further include: a first delay unit outputting the first level signal after the lapse of a prescribed delay period; a second delay unit outputting the second level signal after the lapse of the delay period; a first logic gate logically operating an output signal from the first delay unit and the first level signal to generate a signal for operating the ACF converter; and a second logic gate logically operating an output signal from the second delay unit and the second level signal to generate a signal for operating the flyback converter, wherein the forwarding signal for operating the ACF converter is generated according to an output signal from the first logic gate, and the backwarding signal for operating the flyback converter is generated according to an output signal from the second logic gate. The delay period may be a prescribed time margin for preventing the occurrence of a case in which the forwarding signal and the backwarding signal are in an enabled state.

The ACF converter may forward the current to the secondary side by using the DC input inputted to the primary side according to the forwarding signal of the enable level. The ACF may include: a transformer including a primary side coil having one end to which the DC input is delivered and a secondary side coil supplying current to an output capacitor generating the hybrid output voltage; a main switch connected to the other end of the primary side coil; a capacitor having one end connected to the other end of the primary side coil; and an auxiliary switch connected to the other end of the capacitor.

The inverter controller may include an ACF controller generating a main gate signal and an auxiliary gate signal for controlling the switching operation of the main switch and the switching operation of the auxiliary switch, respectively, by using the hybrid output voltage according to the forwarding signal of the enable level. The ACF controller may include: a feedback signal generation unit comparing a reference voltage set to have the rectified AC waveform in synchronization with the frequency and phase of the hybrid output voltage and the hybrid output voltage to generate a feedback signal; a pyramidal wave signal generation unit generating a pyramidal wave signal for determining a switching frequency of the main switch and that of the auxiliary switch; and a PWM comparator generating a comparison signal according to the result obtained by comparing the feedback signal and the pyramidal wave signal, wherein the ACF controller generates the main gate signal of a level for turning on the main switch upon being synchronized with a first edge of the comparison signal according to the forwarding signal of the enable level, and generates the auxiliary gate signal of a level for turning on the auxiliary switch upon being synchronized with a second edge of an inverted comparison signal, which is obtained by inverting the comparison signal, according to the forwarding signal of the enable level.

The ACF controller may further include: a first delay unit outputting the comparison signal after the lapse of a prescribed delay period, when the first edge of the comparison signal is detected; a second delay unit outputting the inverted comparison signal after the lapse of the delay period, when the second edge of the inverted comparison signal is detected; a first logically operating unit logically operating the comparison signal and an output signal from the first delay unit and outputting a resultant signal; and a second logically operating unit logically operating the inverted comparison signal and an output signal from the second delay unit and outputting a resultant signal, wherein the main gate signal is generated according to the forwarding signal of the enable level and the signal from the first logically operating unit, and the auxiliary gate signal is generated according to the forwarding signal of the enable level and the signal from the second logically operating unit.

The ACF converter may include: a first rectifying diode including an anode electrode connected to one end of the secondary side coil; a second rectifying diode including an anode electrode connected to the other end of the secondary side coil and a cathode electrode connected to a cathode electrode of the first rectifying diode; and an output filter inductor having one end connected to the cathode electrode of the first rectifying diode and to the cathode electrode of the second rectifying diode and the other end connected to the output capacitor.

The flyback converter may send the current to the primary side backwards by using the hybrid output voltage inputted to the secondary side according to the backwarding signal of the enable level. The flyback converter may include: a transformer including a primary side coil having one end to which the hybrid output voltage is delivered and a secondary side coil connected to the primary side; and a power switch connected to the other end of the primary side coil. The inverter controller may include a flyback controller generating an auxiliary gate signal for controlling a switching operation of the power switch by using the hybrid output voltage according to the backwarding signal of the enable level.

The flyback controller may include: a feedback signal generation unit comparing a reference voltage set to have a rectified AC waveform in synchronization with the frequency and phase of the hybrid output voltage and the hybrid output voltage to generate a feedback signal; a pyramidal wave signal generation unit generating a pyramidal wave signal for determining a switching frequency of the power switch; and a PWM comparator generating a comparison signal according to the result obtained by comparing the feedback signal and the pyramidal wave signal, wherein the auxiliary gate signal of the level for turning on the power switch is generated upon being synchronized with a first edge of the comparison signal according to the backwarding signal of the enable level.

The toggle circuit may toggle the hybrid output voltage in units of one period of the hybrid output voltage upon being synchronized with a first time point at which the hybrid output voltage drops to be lower than a prescribed toggle reference voltage. The inverter controller may include a toggle controller detecting the first time point by detecting the hybrid output voltage, and toggle a pass gate signal and a flip gate signal for controlling the operation of the toggle circuit upon being synchronized with the first time point.

The toggle circuit may include: two pass switches performing a switching operation according to the pass gate signal, respectively; and two flip switches performing a switching operation according to the flip gate signal, respectively, wherein when the two pass switches are turned on, the hybrid output voltage becomes the AC output, and when the two flip switches are turned on, a hybrid output voltage-inverted voltage becomes the AC output.

The toggle controller may include: a toggle comparator including a first terminal to which the hybrid input voltage is inputted and a second terminal to which the toggle reference voltage is inputted, and generating a signal according to the result obtained by comparing the two signals each inputted to the first and second terminals; a toggle latch synchronized with an edge of a signal from the toggle comparator and outputting a first level signal after the lapse of a prescribed delay period from the edge time point; and a D-flipflop including an output terminal from which the pass gate signal is outputted, an inversion output terminal from which the flip gate signal is outputted, an input terminal connected to the inversion output terminal, and a clock terminal to which the output signal of the toggle latch is inputted, outputting a signal of the input terminal as the pass gate signal and inverting the pass gate signal to output it as the flip gate signal, upon being synchronized with the first level signal.

Another embodiment of the present invention provides a method for driving an inverter including an active clamp forward (ACF) converter and a flyback converter, including: forwarding current from a primary side to a secondary side by using the ACF converter; backwarding current from the secondary side to the primary side by using the flyback converter; and selecting one of the forwarding operation and the backwarding operation according to a hybrid output voltage such that the hybrid output voltage conforms to a rectified AC waveform.

The method may further include detecting the waveform of the hybrid output voltage and toggling the hybrid output voltage in units of one period of the hybrid output voltage to generate an AC output.

In selecting one of the forwarding operation and the backwarding operation, one of the forwarding operation and the backwarding operation may be selected such that the hybrid output voltage comes within a prescribed rectified AC critical range, and the rectified AC critical range may be set based on the rectified AC waveform.

A lower limit of the rectified AC critical range may be a waveform obtained by multiplying a first gain to the rectified AC waveform, an upper limit of the rectified AC critical range may be a waveform obtained by multiplying a second gain to the rectified AC waveform, the second gain may be greater than 1, and the first gain may be smaller than 1.

The selecting of one of the forwarding operation and the backwarding operation may include: when the hybrid output voltage is reduced to the lower limit, selecting the forwarding operation until before the hybrid output voltage reaches the upper limit; and when the hybrid output voltage is increased to the upper limit, selecting the backwarding operation until before the hybrid output voltage reaches the lower limit.

DETAILED DESCRIPTION OF THE EMBODIMENTS

Figure 1:
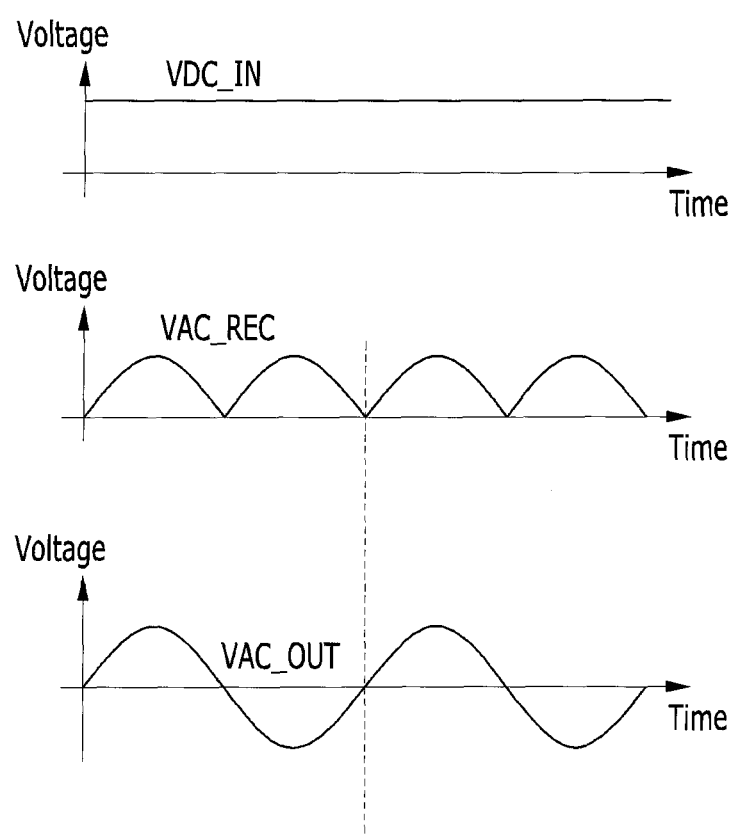
FIG. 1 is a view illustrating waveforms of a DC input (VDC_IN), a rectified AC (VAC_REC), and an AC output (VAC_OUT).

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

A soft switching scheme is applied to an inverter according to an exemplary embodiment of the present invention in order to improve a switching loss through hard switching. In order to generate a rectified AC according to the soft switching scheme, in an exemplary embodiment of the present invention, a hybrid scheme obtained by combining an active clamp forward topology and a flyback topology is applied. That is, in order to generate a rectified AC, the inverter according to an exemplary embodiment of the present invention includes a hybrid converter configured by combining an active clamp forward (ACF) converter and a flyback converter.

FIG. 1 is a view illustrating waveforms of a DC input (VDC_IN), a rectified AC (VAC_REC), and an AC output (VAC_OUT).

The inverter according to an exemplary embodiment of the present invention is configured as a cascade type of inverter. That is, the inverter according to an exemplary embodiment of the present invention includes two stages: a first stage converts a DC input (VDC_IN) into a hybrid output voltage conforming to a rectified AC (VAC_REC); and a second stage inverts and non-inverts the rectified AC to convert it into an AC output (VAC_OUT).

As shown in FIG. 1, in order to generate the DC input such that it has such a waveform that increases and decreases like the rectified AC, the hybrid converter must be able to perform a forwarding operation of supplying power from a primary side to a secondary side and a backwarding operation of retrieving power from the secondary side to the primary side.

The rectified AC (VAC_REC) illustrated in FIG. 1 is a reference waveform of an output voltage of the hybrid converter (VHO) (referred to as a "hybrid output voltage", hereinafter). The hybrid output voltage according to an exemplary embodiment of the present invention is controlled to be included in a prescribed rectified AC critical range to have a waveform conforming to the rectified AC (VAC_REC).

The rectified AC critical range is determined based on the waveform of the rectified AC (VAC_REC). That is, the rectified AC critical range is determined by a lower limit generated by multiplying a prescribed gain value (which is smaller than 1, e.g., 0.97) to the rectified AC (VAC_REC) and an upper limit generated by multiplying a prescribed gain value (which is greater than 1, e.g., 1.1) to the rectified AC (VAC_REC). The rectified AC critical range refers to a voltage range between the lower limit and the upper limit.

The AFC converter 10 delivers current from the primary side to the secondary side such that the hybrid output voltage is not higher than the lower limit and comes within the rectified AC critical range. The flyback converter 20 delivers from the secondary side to the primary side such that the hybrid output voltage is not higher than the upper limit and comes within the rectified AC critical range.

The configuration of the inverter including the hybrid converter, as a configuration for generating a rectified AC, will now be described in detail with reference to FIGS. 2 to 13.

Figure 2A:
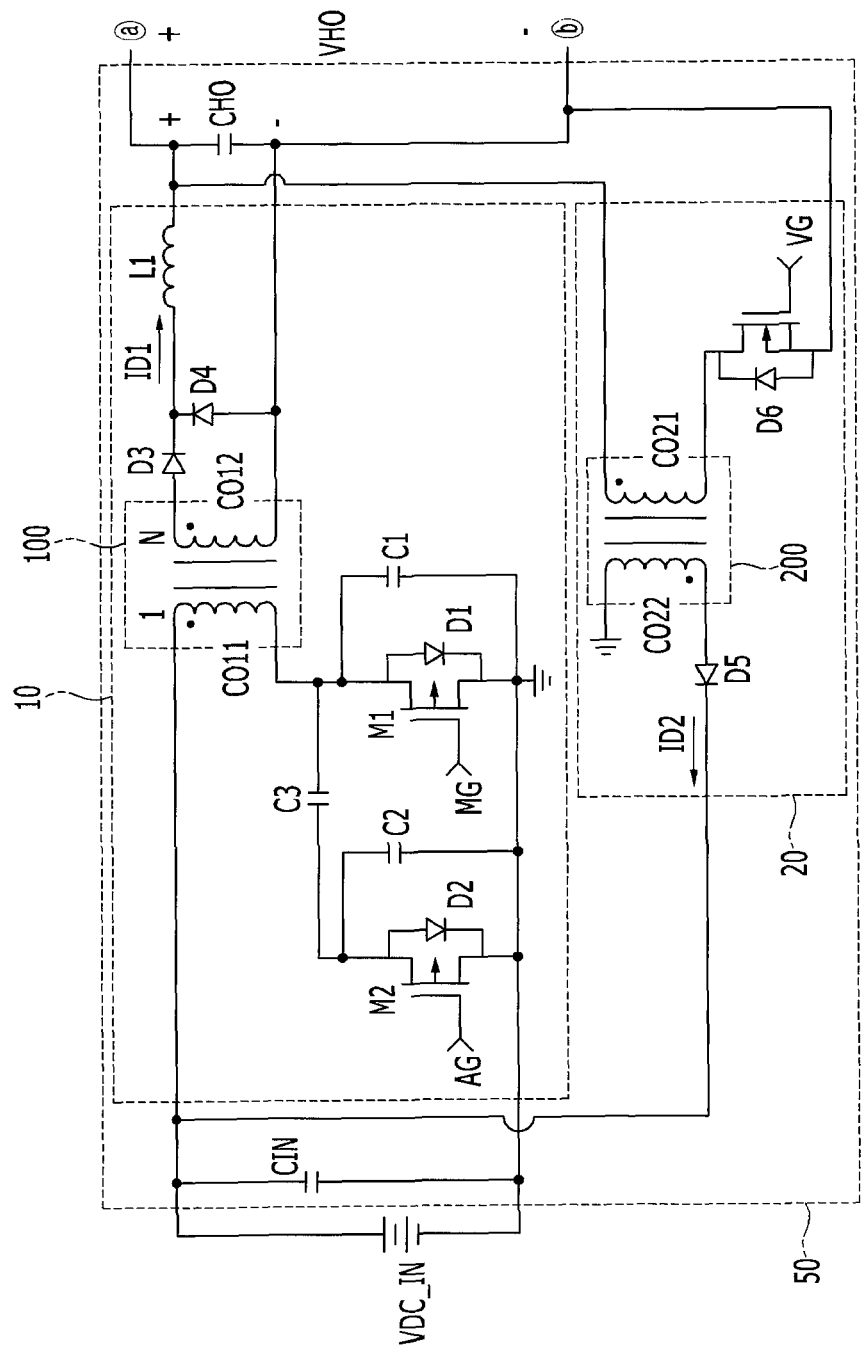
FIG. 2 is a circuit diagram of an inverter 1 according to an exemplary embodiment of the present invention.
Figure 2B:
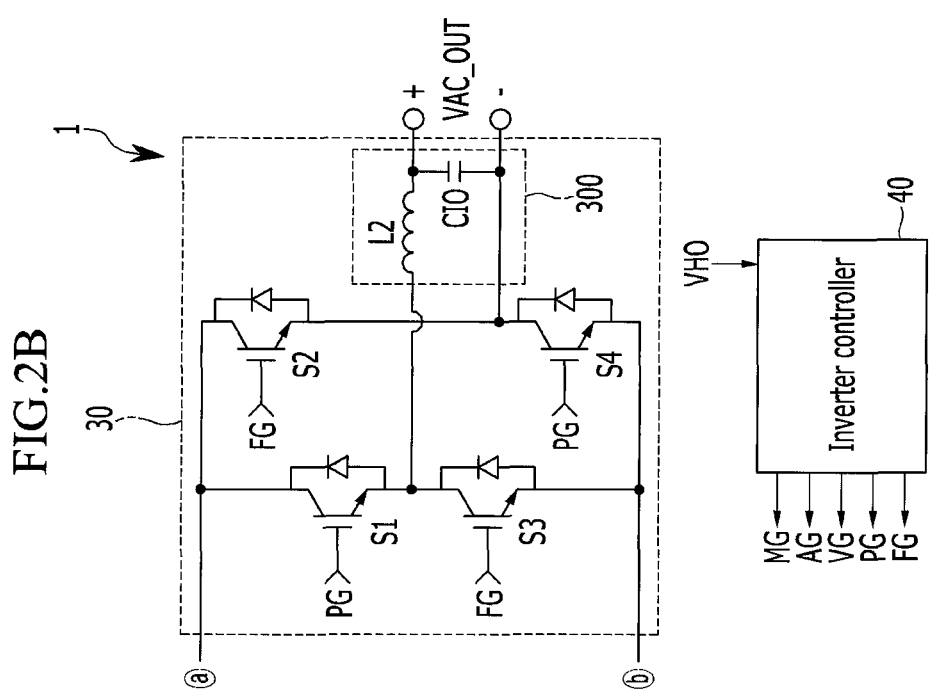

FIG. 2 is a circuit diagram of an inverter 1 according to an exemplary embodiment of the present invention.

The inverter 1 includes a hybrid converter 50, a toggle circuit 30, and an inverter controller 40.

The hybrid converter 50 receives the DC input (VDC_IN) and generates the hybrid output voltage VHO conforming to the rectified AC waveform.

The hybrid converter 50 includes an input capacitor CIN, an output capacitor CHO, the ACF converter 10, and the flyback converter 20. An input terminal of the ACF converter 10 and an output terminal of the flyback converter 20 are connected to the input capacitor CIN, and an output terminal of the ACF converter 10 and an input terminal of the flyback converter 20 are connected to the output capacitor CHO.

The inverter controller 40 receives the output voltage VHO, controls the operation of the hybrid converter 50 such that the output voltage VHO becomes a rectified AC, and controls a switching operation of the toggle circuit 30 to allow the AC output (VAC_OUT) to be generated. The inverter controller 40 compares the output voltage VHO and the prescribed rectified AC critical range, selects a suitable one of the ACF converter 10 and the flyback converter 20, and generates a gate signal for controlling a switching operation of the selected converter. The rectified AC critical range is a reference voltage range used for selecting one of the ACF converter 10 and the flyback converter 20. A detailed operation of the inverter controller 40 will be described with reference to FIG. 3.

The ACF converter 10 includes a main switch M1, an auxiliary switch M2, a capacitor C3, a transformer 100, two diodes D3 and D4, and an output filter inductor L1. The main switch M1 and the auxiliary switch M2 are N-channel transistor elements, which perform a switching operation according to a main gate signal MG and an auxiliary gate signal VG, respectively. A body diode D1 and a parasitic capacitor C1 are positioned between drain and source electrodes of the main switch M1, and a body diode D2 and a parasitic capacitor C2 are positioned between drain and source electrodes of the auxiliary switch M2.

The main switch M1 includes the drain electrode connected to one of a capacitor C3, the source electrode which is grounded, and a gate electrode to which a main gate signal VG is input. The auxiliary switch M2 includes the drain electrode connected to the other end of the capacitor C3, the source electrode that is grounded, and a gate electrode to which an auxiliary gate signal VG is input. The auxiliary switch M2 and the capacitor C3 are configured to reset a primary side voltage of the transformer 100.

The transformer 100 includes a primary side coil CO11 to which the DC input VDC_IN is delivered and a secondary side coil CO12 that supplies current to the output capacitor CHO. A winding ratio of 1:N is formed between the number of windings of the primary side coil CO11 and that of the secondary side coil CO12.

One end of the input capacitor CIN is connected to one end of the primary side coil CO11, and the DC input (VDC_IN) is inputted thereto. The other end of the primary side coil CO11 is connected to one end of the capacitor C3 and the drain electrode of the main switch M1.

The secondary side coil CO12 has one end connected to an anode electrode of the rectifying diode D3 and the other end connected to an anode electrode of the rectifying diode D4.

Cathode electrodes of the rectifying diode D3 and the rectifying diode D4 are connected to one end of the output filter inductor L1. The other end of the output filter inductor L1 is connected to one end of the output capacitor CHO. The output filter inductor L1 cancels noise of rectified current delivered through one of electrically connected rectifying diodes D3 and D4, and delivers the noise-canceled rectified current to the output capacitor CHO.

The main switch M1 and the auxiliary switch M2 are turned on by turns. First, when the main switch M1 is turned on, current flowing across the primary side coil CO11 of the transformer 100 is delivered to the secondary side coil CO12. In this case, the current flowing across the secondary side coil CO12 becomes a rectified current ID1 through the rectifying diode D3 in an electrically connected state, and the rectified current ID1, passing through the output filter inductor L1, is delivered to the output capacitor CHO.

The main switch M1 is turned off, and the auxiliary switch M2 is turned on after the lapse of a prescribed dead time period. The current flowing across the primary side coil CO11 during the dead time period is charged in the capacitor C3, making the voltage at the other end of the primary side coil CO11 higher than the voltage at one end of the primary side coil CO11. That is, the voltage polarity of the primary side coil CO11 is changed. Then, the voltage polarity of the secondary side coil is also changed to cause the rectifying diode D3 to be turned off and the rectifying diode D4 to be electrically connected.

When the auxiliary switch is turned on, current of the primary side coil CO11 flows through the capacitor C3 and the auxiliary switch M2. During this period, the voltage that has been increased during the dead time period is maintained at the other end of the primary side coil CO11, and the current of the primary side coil CO11 is gradually reduced to have a value close to zero current. Thus, while the auxiliary switch M2 is being turned on, the primary side voltage of the transformer 100 is reset.

When the auxiliary switch M2 is turned off, the main switch M1 is turned on after the lapse of a prescribed dead time period. During the dead time period, the capacitor C3 is discharged, so the voltage at the other end of the primary side coil CO11 becomes close to zero voltage. Thus, the main switch M1 can perform zero voltage switching. Also, because the polarity of the primary side voltage of the transformer 100 is changed again during the dead time period, the rectifying diode D4 is turned off and the rectifying diode D3 is turned on.

The flyback converter 20 includes a transformer 200, a power switch QS, and a rectifying diode D5. A body diode D6 is connected between a drain electrode and a source electrode of the power switch QS.

The transformer 200 includes a primary side coil CO21 and a secondary side coil CO22. The primary side coil CO21 has one end connected to one end of the output capacitor CHO and the other end connected with the drain electrode of the power switch QS. The secondary side coil CO22 has one end connected to an anode electrode of the rectifying diode D5 and the other end that is grounded.

The power switch QS is an N-channel transistor element, performing a switching operation according to the auxiliary gate signal VG inputted to the gate electrode. The source electrode of the power switch QS is connected to the other end of the output capacitor CHO.

A cathode electrode of the rectifying diode D5 is connected to one end of the input capacitor CIN.

While the power switch QS is being turned on, current flows across the primary side coil CO21 by the hybrid output voltage VHO. While the power switch is being turned on, current flowing across the power switch QS increases.

At a time point when the power switch QS is turned off, the rectifying diode D5 is turned on and a rectified current ID2 starts to flow. During the turn-off period of the power switch QS, the rectified current ID2 decreases. In this case, energy delivered to the primary side due to the backwarding operation of making the rectified current ID2 flow is not large and the capacitance of the input capacitor C1 is so large that the value of the input voltage VDC_IN is barely affected. As well as the backwarding operation, a forwarding operation of delivering energy to the secondary side also continues to take place, so the input voltage (VDC_IN) is maintained to be uniform.

The toggle circuit 30 according to an exemplary embodiment of the present invention includes a full-bridge inverter.

The toggle circuit 30 toggles the hybrid output voltage VHO in units of one period of the hybrid output voltage VHO to generate the AC output (VAC_OUT). The toggle circuit 30 includes two pass switches S1 and S4, two flip switches S2 and S3, and an output filter 300. The two pass switches S1 and S4 and the two flip switches S2 and S3 are used as N-channel bipolar junction transistors (BJTs).

The two pass switches S1 and S4 perform a switching operation, respectively, according to a pass gate signal PG delivered from the inverter controller 40, and the two flip switches S2 and S3 perform a switching operation, respectively, according to a flip gate signal FG delivered from the inverter controller 40. The inverter controller 40 is synchronized at a time point when the hybrid output voltage VHO drops to below a prescribed voltage, to toggle the pass gate signal PG and the flip gate signal FG. The pass gate signal PG and the flip gate signal FG have mutually inverted phases.

Thus, while the two pass switches S1 and S4 are turned on, the two flip switches S2 and S3 are turned off, and while the two pass switches S1 and S4 are turned off, the two flip switches S2 and S3 are turned on.

A collector of the pass switch S1 and that of the flip switch S2 are connected to one end of the output capacitor CHO, and an emitter of the pass switch S1 is connected to an inductor L2 of the output filter 300. An emitter of the flip switch S2 is connected to one end of a capacitor CIO of the output filter 300. The pass gate signal PG is delivered to a base of the pass switch S1, and the flip gate signal FG is delivered to a base of the flip switch S2.

The pass switch S4 includes a collector connected to one end of the capacitor CIO, an emitter connected to the other end of the output capacitor CHO, and a base to which the pass gate signal PG is delivered.

The flip switch S3 includes a collector connected to the inductor L2, an emitter connected to the other end of the output capacitor CHO, and a base to which the flip gate signal FG is delivered.

When the pass switch S1 and the pass switch S4 are turned on, the hybrid output voltage VHO is delivered to the output filter 300. When the flip switch S2 and the flip switch S3 are turned on, the phase of the hybrid output voltage VHO is inverted so as to be delivered to the output filter 300.

In order to generate the AC output (VAC_OUT) by using the hybrid output voltage VHO having the rectified AC waveform, the two pass switches S1 and S4 and the two flip switches S2 and S3 are switched at every one period of the hybrid output voltage VHO.

That is, the two pass switches SI and S4 are turned on during one period of the hybrid output voltage VHO, and at this time, the two flip switches S2 and S3 are in a turn-off state. The two flip switches S2 and S3 are turned on and the two pass switches S1 and S4 are turned off during the next one period of the hybrid output voltage VHO.

The output filter 300 cancels noise of the received hybrid output voltage VHO to generate the AC output (VAC_OUT).

Figure 3:
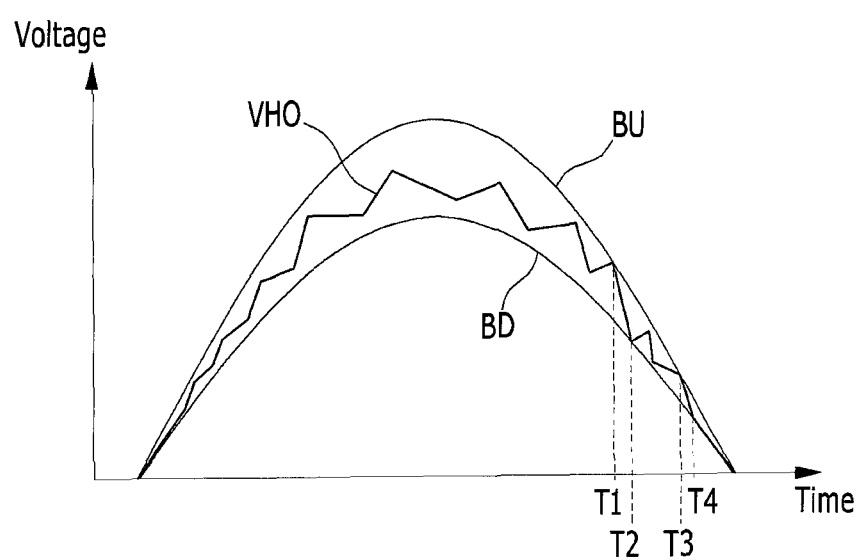
FIG. 3 is a graph showing a rectified AC voltage (VAC_REC) and a method of selecting one of an active clamp forward (ACF) converter 10 and a flyback converter 20 according to an exemplary embodiment of the present invention.

FIG. 3 is a graph showing a method for selecting one of a hybrid output voltage VHO, an active clamp forward converter (ACF) 10, and a flyback converter 20 according to an exemplary embodiment of the present invention. FIG. 3 simply shows the hybrid output voltage VHO, an upper limit BU, and a lower limit BD in order to explain an exemplary embodiment of the present invention, and the present invention is not limited thereto. The hybrid output voltage VHO may have a different waveform according to a load.

As shown in FIG. 3, the inverter controller 40 selectively drives one of the ACF converter 10 and the flyback converter 20 so that the hybrid output voltage VHO can come between the upper limit BU and the lower limit BD.

A rectified AC critical range conforming to the rectified AC (VAC_REC) and the hybrid output voltage VHO are compared, and if the hybrid output voltage VHO overpasses the upper limit BU of the rectified AC critical range, the inverter controller 40 operates the flyback converter 20 to force the hybrid output voltage VHO to remain within the critical range. While the flyback converter 20 is operating, if the hybrid output voltage VHO drops to below the lower limit BL, the inverter controller 40 controls the ACF converter 10 to force the hybrid output voltage VHO to remain within the critical range.

Until before the hybrid output voltage VHO meets the upper limit BU at a time point T1, the inverter controller 40 operates only the ACF converter 10. In order to generate the hybrid output voltage VHO such that it has such a waveform as that of the rectified AC (VAC_REC), the hybrid output voltage VHO should not overpass the upper limit BU. In order to prevent the hybrid output voltage VHO from passing over the upper limit BU from the time point T1, the inverter controller 40 operates only the flyback converter 20. Starting from the time point T1, the hybrid output voltage VHO does not reach the upper limit BU due to a backwarding operation.

The hybrid output voltage VHO meets the lower limit BD at a time point T2. In order to prevent the hybrid output voltage VHO from dropping to below the lower limit BD from the time point T2, the inverter controller 40 operates only the ACF converter 10. Starting from the time point T2, the hybrid output voltage VHO is not reduced as low as the lower limit BD due to the forwarding operation.

When the hybrid output voltage VHO reaches the upper limit BU at a time point T3, only the flyback converter 20 operates to perform the backwarding operation. When the hybrid output voltage VHO is reduced as low as the lower limit BD at a time point T4, only the ACF converter 10 operates to perform the forwarding operation.

In this manner, the hybrid converter 50 is controlled according to the method illustrated in FIG. 3 to force the hybrid output voltage VHO to conform to the rectified AC waveform. The waveform of FIG. 3 is merely illustrated to explain the present invention, and the waveform of the hybrid output voltage VHO is not limited thereto.

The operation of the inverter circuit according to an exemplary embodiment of the present invention will now be described with reference to waveform views according to loads of a plurality of gate signals, the output voltage VHO, and the AC output (VAC_OUT). FIGS. 4 to 8 show waveforms of the plurality of gate signals, the output voltage VHO, and the AC output (VAC_OUT) under different load conditions.

Figure 4:
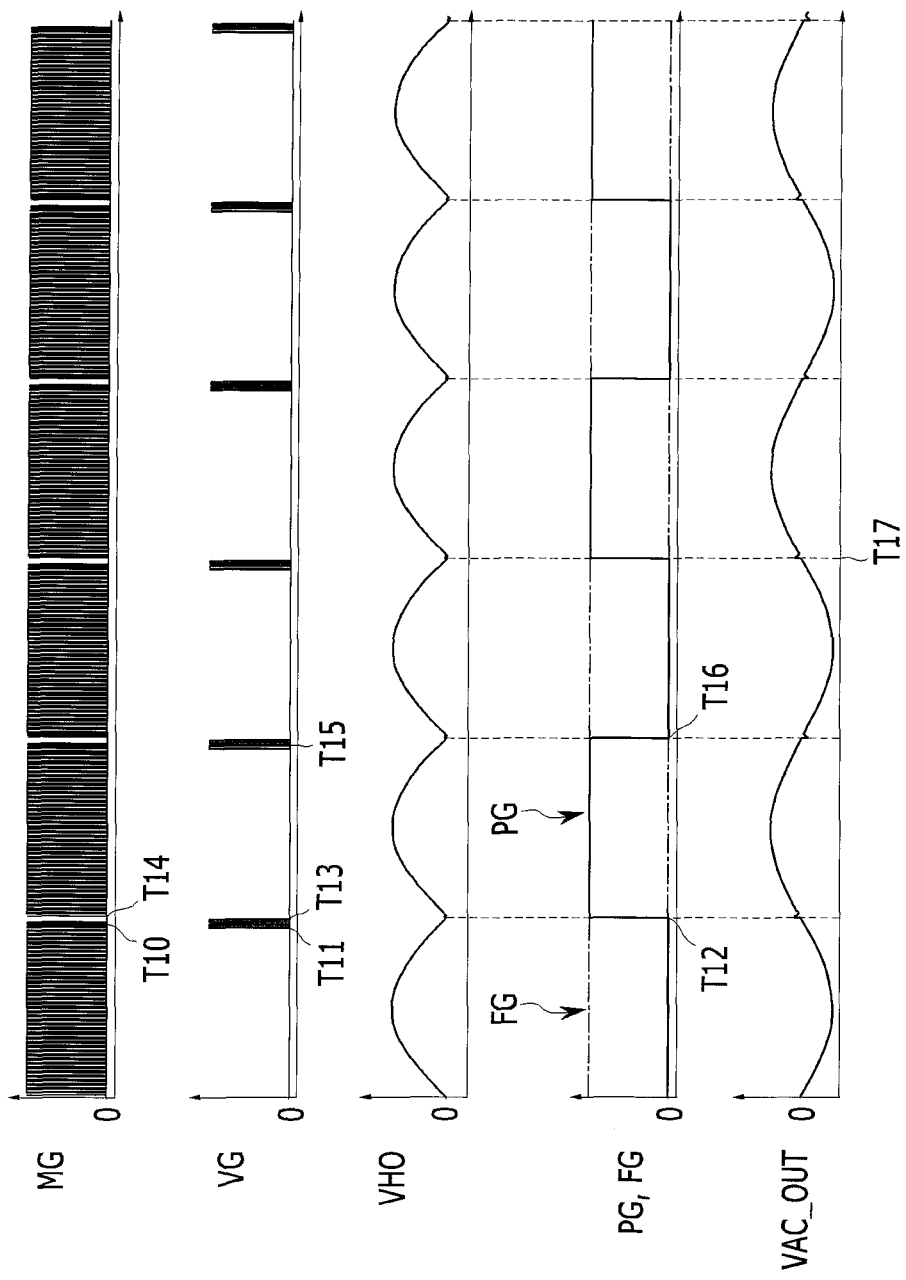
FIG. 4 is a view illustrating outputs of a main gate signal of the ACF converter, an auxiliary gate signal of the flyback converter, a hybrid output voltage, a pass gate signal, a flip gate signal, and an AC, when a load of the inverter 1 is 1 kW.

First, FIG. 4 is a view showing a main gate signal of the ACF, an auxiliary gate signal of the flyback converter, a hybrid output voltage, a pass gate signal, a flip gate signal, and an AC output when the load of the inverter 1 is 1 kW.

The main gate signal and the auxiliary gate signal have a very high frequency. When expressed with other signals based on the same time scale, the main gate signal and the auxiliary gate signal are illustrated to be shaded as shown in FIG. 4. This is because the intervals between a plurality of pulse waveforms of each of the gain gate signal and the auxiliary gate signal are very narrow.

As shown in FIG. 4, in order to make the hybrid output voltage VHO reduced to be close to zero voltage, the flyback converter 20 operates starting from a time point T11. While the flyback converter 20 is operating during the period of T11~T13, the ACF converter 10 also operates during a certain period, and in this case, while the ACF converter 10 is operating, the flyback converter 20 does not operate. The ACF converter 10 does not operate during the period of T10~T14.

The inverter controller 40 is synchronized at a time point when the hybrid output voltage VHO drops to below a prescribed voltage, to toggle the pass gate signal PG and the flip gate signal FG. That is, at the time point T12, the inverter controller 40 increases the low level pass gate signal PG to have a high level, and lowers the high level flip gate signal FG to have a low level.

That is, the pass gate signal PG comes to have a high level, causing the two pass switches S1 and S4 to be turned on.

Then, during the period of T12~T16, the hybrid output voltage VHO passes through the output filter 300 so as to become the AC output (VAC_OUT).

The ACF converter 10 operates starting from the time point T14, and the flyback converter 20 does not operate during the period of T14~T15. An operation following the time point T15 is performed in the same manner as described above. At the time point T16, the inverter controller 40 lowers the pass gate signal PG from the high level to a low level and increases the flip gate signal FG from the low level to a high level.

That is, the flip gate signal FG comes to have a high level, causing the two flip switches S2 and S3 to be turned on. Then, during the period of T16~T17, the hybrid output voltage VHO is inverted, and the inverted hybrid output voltage VHO passes through the output filter 300 to become the AC output (VAC_OUT).

Synchronized at a time point when the hybrid output voltage VHO is reduced to below a prescribed voltage, the inverter controller 40 toggles the pass gate signal PG and the flip gate signal FG at the time point T17.

In this manner, the hybrid output voltage VHO passes through the output filter 300 as it is during the period of T12~T16 of the period of T12~T17, and the inverted hybrid output voltage VHO passes through the output filter 300 during the period of T16~T17, thus completing one period of the AC output (VAC_OUT).

Figure 5:
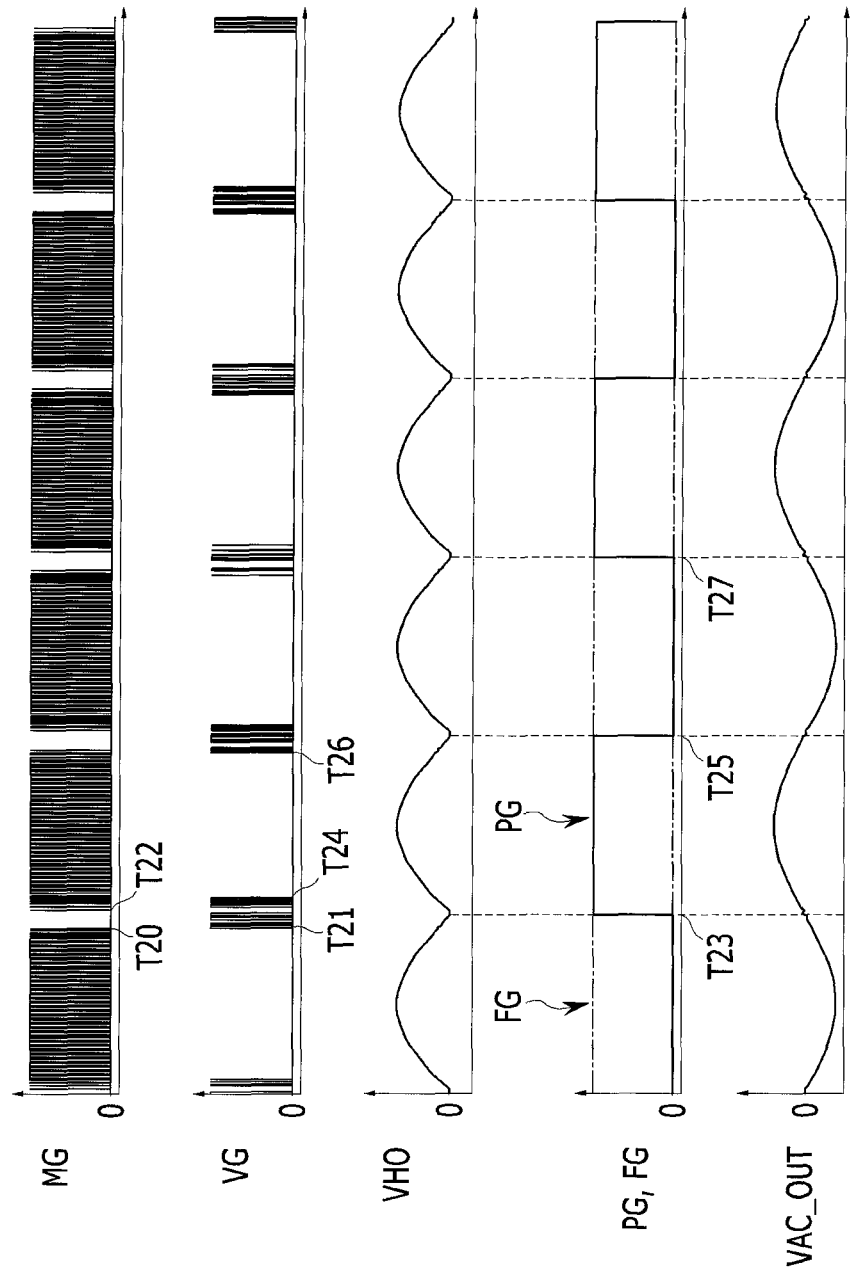
FIG. 5 is a view illustrating outputs of a main gate signal, an auxiliary gate signal, a hybrid output voltage, a pass gate signal, a flip gate signal, and an AC, when the load of the inverter 1 is 100 W, which is lower than that of the load in FIG. 4.

FIG. 5 is a view illustrating outputs of a main gate signal, an auxiliary gate signal, a hybrid output voltage, a pass gate signal, a flip gate signal, and an AC, when the load of the inverter 1 is 100 W, which is lower than that of the load in FIG. 4.

As shown in FIG. 5, the flyback converter 20 operates starting from a time point T21 in order to cause the hybrid output voltage VHO to be reduced to zero voltage. While the flyback converter 20 is operating during the period of T21~T24, the ACF converter 10 also operates during a certain period, and in this case, while the ACF converter 10 is operating, the flyback converter 20 does not operate. The ACF converter 10 does not operate during the period of T20~T22.

A time point for toggling the pass gate signal PG and the flip gate signal FG is the same as that described above with reference to FIG. 4. That is, at the time point T23, the inverter controller 40 increases the low level pass gate signal PG to have a high level and lowers the high level flip gate signal FG to have a low level. Then, during the period of T23~T24, the hybrid output voltage VHO passes through the output filter 300 to become the AC output (VAC_OUT).

The ACF converter 10 operates starting from the time point T22, and the flyback converter 20 does not operate during the period of T24~T26.

At the time point T25, the inverter controller 40 lowers the pass gate signal PG from the high level to a low level and increases the flip gate signal FG from the low level to a high level. Then, during the period of T25~T27, the hybrid output voltage VHO is inverted, and the inverted hybrid output voltage VHO passes through the output filter 300 to become the AC output (VAC_OUT).

Synchronized at a time point when the hybrid output voltage VHO is reduced to below a prescribed voltage, the inverter controller 40 toggles the pass gate signal PG and the flip gate signal FG at the time point T27.

In this manner, the hybrid output voltage VHO passes through the output filter 300 as it is during the period of T23~T25 of the period of T23~T27, and the inverted hybrid output voltage VHO passes through the output filter 300 during the period of T25~T27, thus completing one period of the AC output (VAC_OUT).

Figure 6:
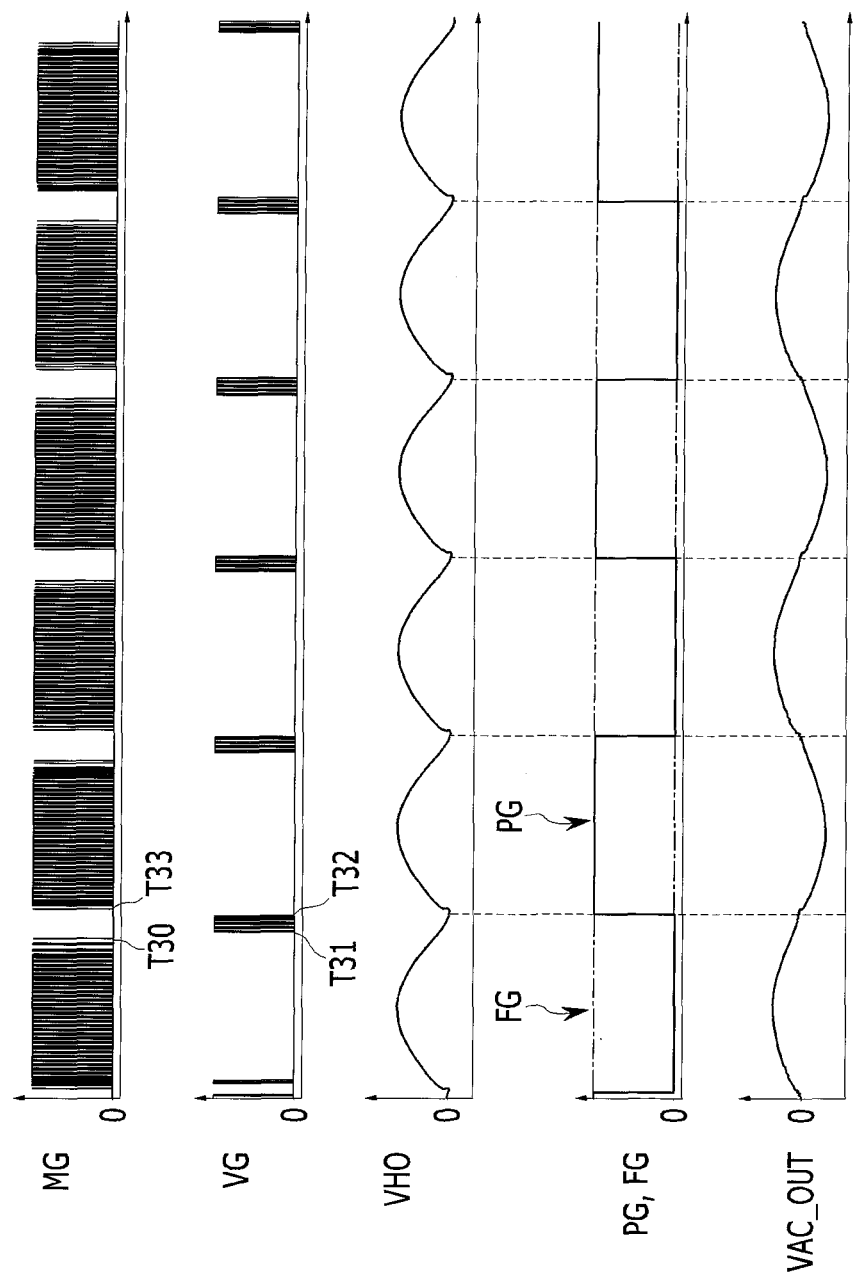
FIGS. 6 to 8 are views illustrating outputs of main gate signals, auxiliary gate signals, hybrid output voltages, pass gate signals, flip gate signals, and ACs, when loads of the inverter 1 are 50 W and 20 W, respectively, and in a no-load state.
Figure 7:
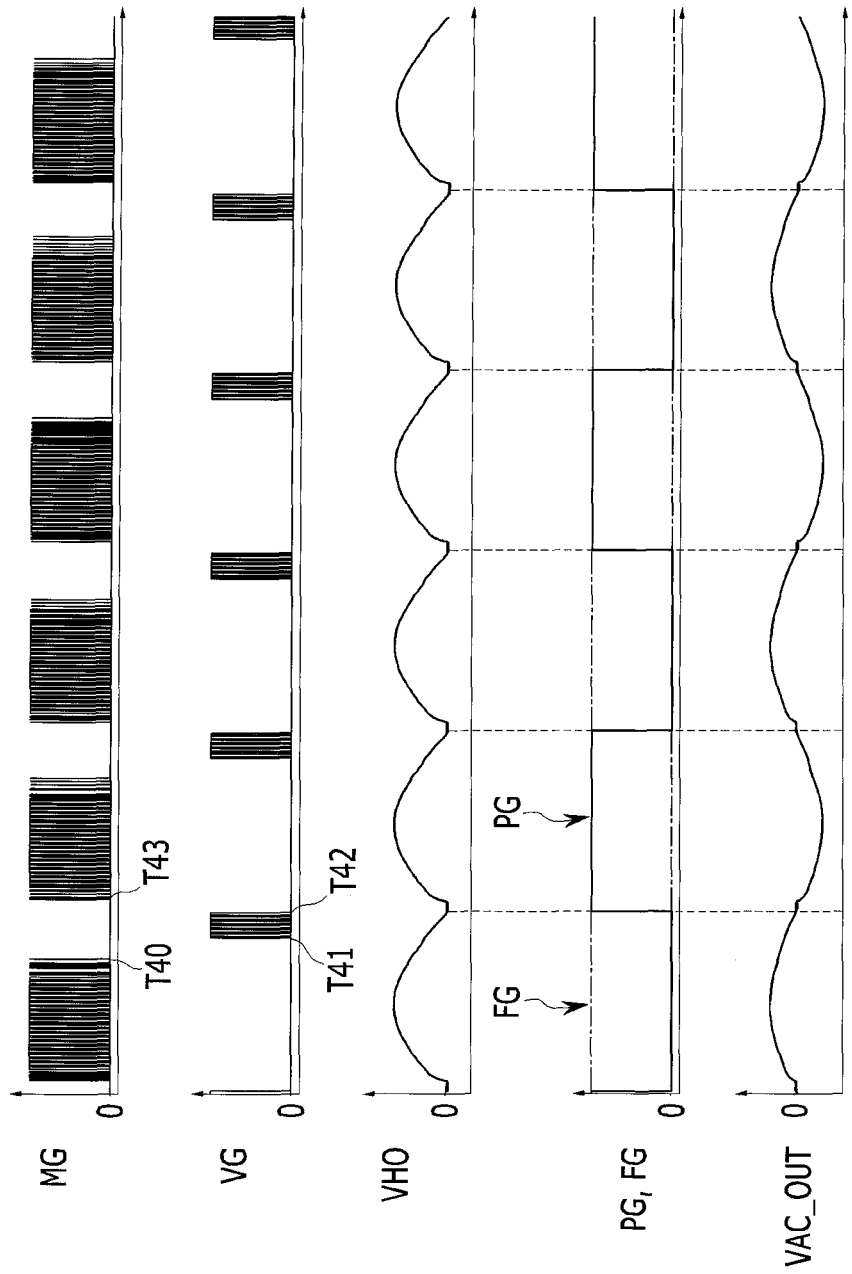
Figure 8:
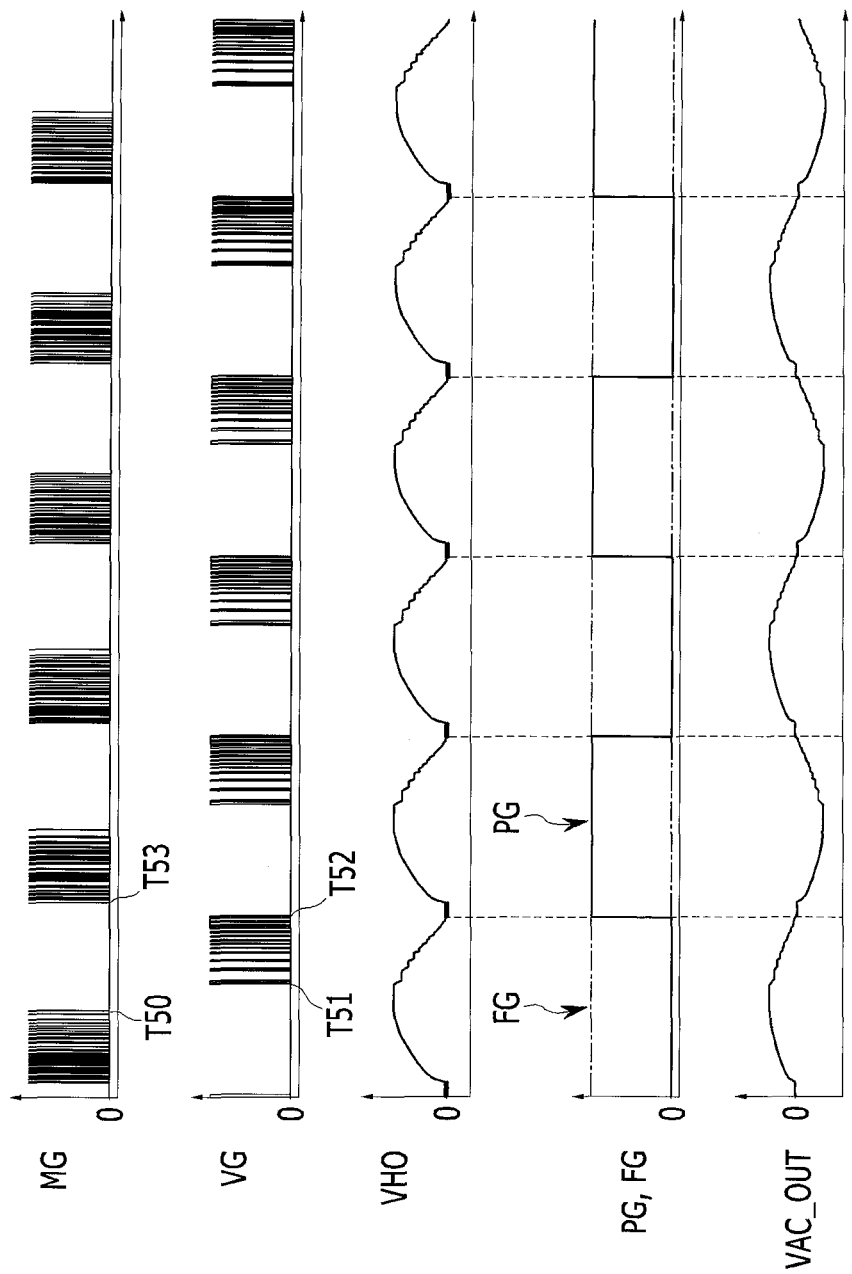

FIGS. 6 to 8 are views illustrating outputs of main gate signals, auxiliary gate signals, hybrid output voltages, pass gate signals, flip gate signals, and ACs, when the loads of the inverter 1 are 50 W and 20 W, respectively, and in a no-load state.

A driving method of the embodiments illustrated in FIGS. 6 to 8 is the same as that described above with reference to FIGS. 4 and 5, so a detailed description the embodiments illustrated in FIGS. 6 to 8 will be omitted.

As shown in FIGS. 4 to 8, as the load is reduced, the period during which the flyback converter 20 operates gradually increases and the period during which ACF converter 10 does not operate gradually increases.

In FIG. 6 with the load of 50 W, the flyback converter 20 operates during the period of T31~T32. Compared with the period of T21~T24, the period of T31~T32 is illustrated to be shorter. However, excluding the period (i.e., white portions between T21 and T24) during which the flyback converter 20 does not operate, of the period of T21~T24 in FIG. 5, the operation period of the flyback converter 20 illustrated in FIG. 6 is substantially longer.

In addition, the period of T30~T33 during which the ACF converter 10 does not operate is longer than the period of T20~T22 illustrated in FIG. 5.

In FIG. 7 with the load 20 W, the period of T41~T42 during which the flyback converter 20 operates is longer than the period of T31~T32 of FIG. 6, and the period of T40~T43 during which the ACF converter 10 does not operate is longer than the period of T30~T33 of FIG. 6.

In FIG. 8 with no load, the period of T51~T52 during which the flyback converter 20 operates is longer than the period of T41~T42 of FIG. 7, and the period of T50~T53 during which the ACF converter 10 does not operate is longer than the period of T40~T43 of FIG. 6.

In this manner, the hybrid converter can generate the AC outputs (VAC_OUT) by appropriately delivering or retrieving power according to the load conditions.

The inverter controller 40 will now be described with reference to FIGS. 9 to 13.

The inverter controller 40 may be implemented in various manners: the exemplary embodiment hereinbelow is merely an example and the present invention is not limited thereto.

Figure 9:
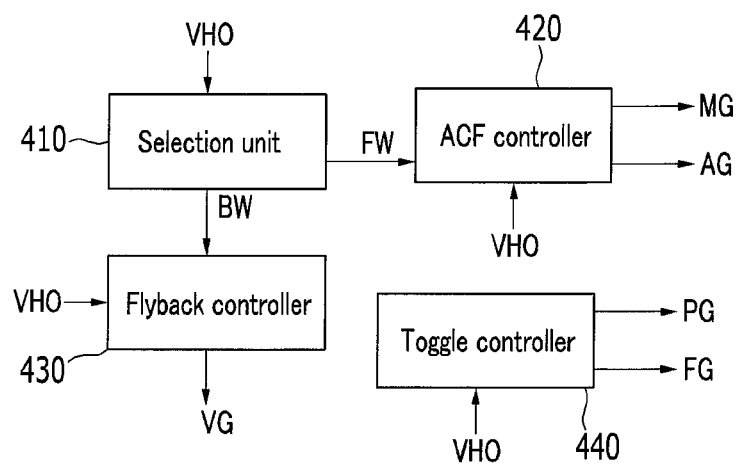
FIG. 9 is a schematic block diagram of an inverter controller 40 according to an exemplary embodiment of the present invention.

FIG. 9 is a schematic block diagram of the inverter controller 40 according to an exemplary embodiment of the present invention.

As shown in FIG. 9, the inverter controller 40 includes a selection unit 410, an ACF controller 420, a flyback controller 430, and a toggle controller 440.

The selection unit 410 compares the hybrid output voltage VHO and the rectified AC critical range and selects one of the ACF converter 10 and the flyback converter 20 to be operated. In detail, as shown in FIG. 3, when the hybrid output voltage VHO reaches the upper limit BU, the selection unit 410 operates the flyback converter 20 until before the hybrid output voltage VHO reaches the lower limit BD. Conversely, when the hybrid output voltage VHO reaches the lower limit BD, the selection unit 410 operates the ACF converter 10 until before the hybrid output voltage VHO reaches the upper limit BU.

Figure 10:
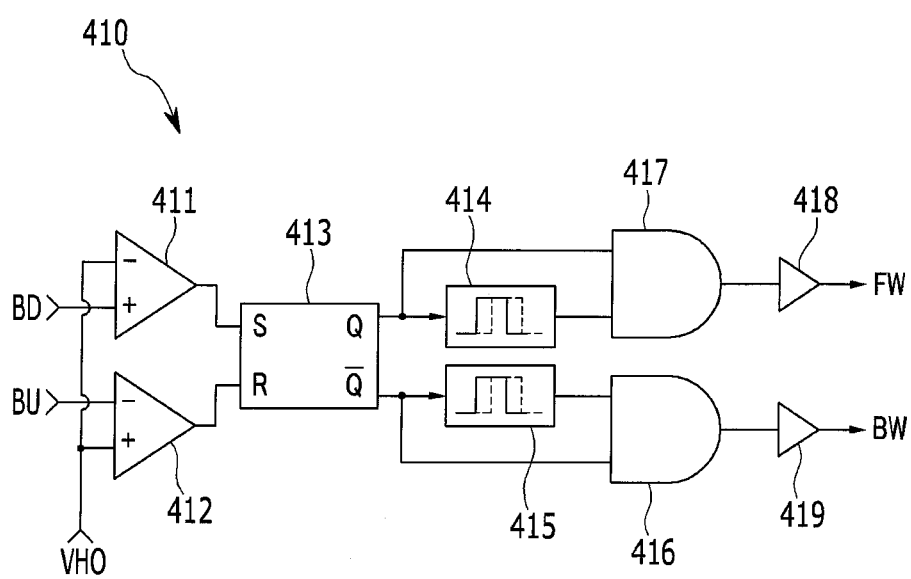
FIG. 10 is a schematic block diagram of a selecting unit 410 according to an exemplary embodiment of the present invention.

FIG. 10 is a schematic block diagram of a selecting unit 410 according to an exemplary embodiment of the present invention.

The selection unit 410 includes a first limit comparator 411, a second limit comparator 412, an SR latch 413, a first delay unit 414, a second delay unit 415, a first AND gate 417, a second AND gate 416, a first driving unit 418, and a second driving unit 419.

The first limit comparator 411 compares the hybrid output voltage VHO and the lower limit BD, and inputs a high level signal or a low level signal to a set terminal (S) of the SR latch 413 according to the comparison results. In this case, when the hybrid output voltage VHO is greater than the lower limit BD, the first limit comparator 411 outputs a high level signal, or otherwise, the first limit comparator 411 outputs a low level signal.

The second limit comparator 412 compares the hybrid output voltage VHO and the upper limit BU and inputs a high level signal or a low level signal to a reset terminal (R) of the SR latch 413 according to the comparison results. In this case, when the hybrid output voltage VHO is greater than the upper limit BU, the second limit comparator 412 outputs a high level signal, or otherwise, the second limit comparator 412 outputs a low level signal.

The SR latch 413, upon being synchronized with a rising edge of the signal inputted to the set terminal (S), outputs a high level signal through an output terminal (Q), and, upon being synchronized with a rising edge of the signal inputted to the reset terminal (R), outputs a high level signal through an inversion output terminal (/Q). While a high level signal is being outputted through the output terminal (Q), a low level signal is outputted through the inversion output terminal (/Q), and while a low level signal is being outputted through the output terminal (Q), a high level signal is outputted through the inversion output terminal (/Q).

When the rising edge of the output signal from the output terminal (Q) of the SR latch 413 is detected, the first delay unit 414 outputs the output signal from the output terminal (Q) after the lapse of a prescribed first delay period. When the rising edge of the output signal from the inversion output terminal (/Q) of the SR latch 413 is detected, the second delay unit 415 outputs the output signal from the output terminal (Q) after the lapse of the prescribed first delay period.

The first AND gate 417 ANDs the output signal from the output terminal (Q) and the output signal from the first delay unit 414 to generate an output signal. When the output signal of the output terminal (Q) has a high level, the first AND gate 417 outputs the high level signal to the first driving unit 418 after the lapse of the first delay period.

When the output signal from the first AND gate 417 has a high level, the first driving unit 418 generates a forwarding signal FW of an enable level for operating the ACF converter 10 and delivers the generated forwarding signal FW to the ACF controller 420.

The second AND gate 416 ANDs the output signal from the inversion output terminal (/Q) and the output signal from the second delay unit 415 to generate an output signal. When the output signal from the inversion output terminal (/Q) has a high level, the second AND gate 416 outputs the high level signal to the second driving unit 419 after the lapse of the first delay period.

When the output signal from the second AND gate 416 has a high level, the second driving unit 419 generates a backwarding signal BW of an enable level for operating the flyback converter 20, and delivers the generated backwarding signal BW to the flyback controller 430.

The first delay period is a prescribed time margin used for preventing the occurrence of a case in which both the forwarding signal FW and the backwarding signal BW are in an enabled state.

Without the first delay unit 414, the second delay unit 415, the first AND gate 417, and the second AND gate 416, the output signal from the output terminal (Q) of the SR latch 413 and the output signal from the inversion output terminal (/Q) of the SR latch 413 can be inputted to the first and second driving units 418 and 419, respectively. The first driving unit 418 may generate the forwarding signal FW of an enable level during a period in which the output signal from the output terminal (Q) has a high level, and the second driving unit 419 may generate the backwarding signal BW of an enable level during a period in which the output signal from the inversion output terminal (/Q) has a high level.

The ACF controller 420 generates the main gate signal MG and the auxiliary gate signal VG for controlling the switching operation of the main switch M1 and the switching operation of the auxiliary switch M2 by using the hybrid output voltage VHO according to the forwarding signal FW of an enable level.

Figure 11:
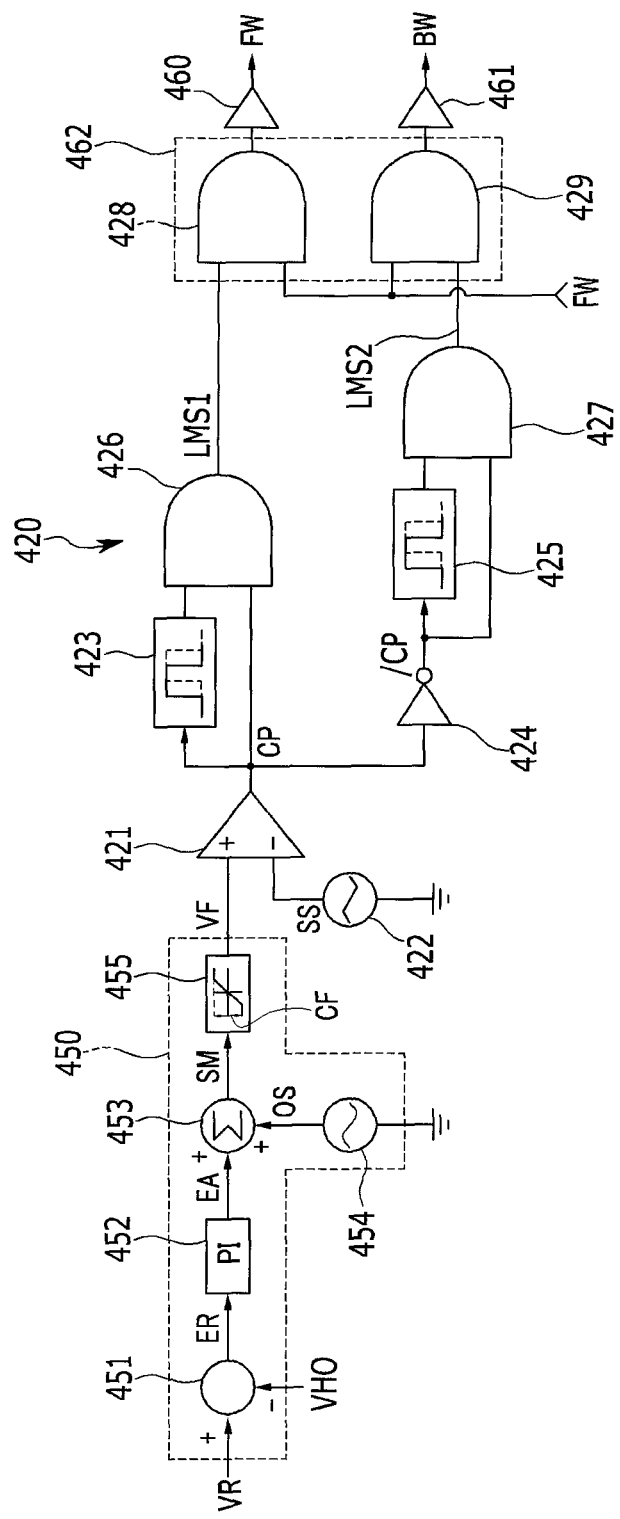
FIG. 11 is a schematic block diagram of an ACF controller 420 according to an exemplary embodiment of the present invention.

FIG. 11 is a schematic block diagram of the ACF controller 420 according to an exemplary embodiment of the present invention.

As shown in FIG. 11, the ACF controller 420 includes a first feedback signal generation unit 450, a first pulse width modulation (PWM) comparator 421, a pyramidal wave signal generation unit 422, an inverter 424, a third delay unit 423, a fourth delay unit 425, a third AND gate 426, a fourth AND gate 427, an output controller 462, a third driving unit 460, and a fourth driving unit 461.

The first feedback signal generation unit 450 compares a reference voltage VR and the hybrid output voltage VHO and generates a feedback signal for controlling the switching operation of the main switch M1 and that of the auxiliary switch M2. The reference voltage VR may be the rectified AC (VAC_REC). That is, the rectified AC waveform in synchronization with the frequency and phase of the hybrid output voltage VHO is set as the reference voltage VR.

The first feedback signal generation unit 450 includes an error generation unit 451, a proportion-integrating unit (PI) 452, an adder 453, an offset generation unit 454, and a clamping unit 455.

The error generation unit 451 generates an error ER between the reference voltage VR and the hybrid output voltage VHO.

The proportion-integrating unit (PI) 452 proportionally integrates the error to generate an error amplified signal EA. In detail, the proportion-integrating unit (PI) 452 generates the error amplified signal EA by adding a value obtained by multiplying a prescribed proportion gain by the error ER and a value obtained by multiplying a prescribed integration gain by a result obtained by integrating the error ER.

The offset generation unit 454 generates an offset (OS) for generating the hybrid output voltage VHO as such having a full wave rectified waveform. The phase and period of the hybrid output voltage VHO are determined according to the period and phase of the offset OS.

The adder 453 adds the offset OS and the error amplified signal EA to generate an added signal SM.

The clamping unit 455 generates a feedback signal VF by limiting a maximum and minimum value so that the added signal SM cannot overpass (or get out of) a clamping range CF.

The pyramidal wave signal generation unit 422 generates a pyramidal wave signal TS. The pyramidal wave signal TS determines a switching frequency of the main switch M1 and that of the auxiliary switch M2.

The first PWM comparator 421 includes a non-inversion terminal (+) to which the feedback signal VF is inputted and an inversion terminal (−) to which the pyramidal wave signal TS is inputted, and when the signal inputted to the non-inversion terminal (+) is larger than the signal inputted to the inversion terminal (−), the first PWM comparator 421 generates a high level comparison signal CP. When the signal inputted to the non-inversion terminal (+) is smaller than the signal inputted to the inversion terminal (−), the first PWM comparator 421 generates a low level comparison signal CR When a rising edge of the comparison signal is detected, the third delay unit 423 outputs a comparison signal CP after the lapse of a second delay period.

The inverter 424 inverts the comparison signal CP to generate an inverted comparison signal /CP.

When a rising edge of the inverted comparison signal /CP is detected, the fourth delay unit 425 outputs the inverted comparison signal /CP after the lapse of the second delay period.

The third AND gate 426 ANDs the comparison signal CP and the delayed comparison signal CP outputted from the third delay unit 423 to generate a first AND signal LMS1.

The fourth AND gate 427 ANDs the inverted comparison signal /CP and the delayed inverted comparison signal /CP outputted from the fourth delay unit 425 to generate a second AND signal LMS2.

The output controller 462 controls the switching operation of the main switch M1 and the auxiliary switch M2 according to the first AND signal LMS1, the second AND signal LMS2, and the forwarding signal FW.

The output controller 462 includes a fifth AND gate 428 and a sixth AND gate 429. The fifth AND gate 428 ANDs the first AND signal LMS1 and the forwarding signal FW and outputs the corresponding result to the third driving unit 460. The sixth AND gate 429 ANDs the second AND signal LMS2 and the forwarding signal FW and outputs the corresponding result to the fourth driving unit 461.

When the output from the fifth AND gate 428 has a high level, the third driving unit 460 generates a main gate signal MG for turning on the main switch M1, and when the output from the fifth AND gate 428 has a low level, the third driving unit 460 generates a main gate signal MG for turning off the main switch M1.

When the output from the sixth AND gate 429 has a high level, the fourth driving unit 461 generates an auxiliary gate signal VG for turning on the auxiliary switch M2, and when the output from the sixth AND gate 429 has a low level, the fourth driving unit 461 generates an auxiliary gate signal VG for turning off the auxiliary switch M2.

In case in which the enable level of the forwarding signal FW according to an exemplary embodiment of the present invention is a high level, the main switch M1 is turned on when the feedback signal VF is larger than the pyramidal wave signal TS, and the auxiliary switch M2 is turned on when the feedback signal VF is smaller than the pyramidal wave signal TS. When the forwarding signal FW has a low level, both the main switch M1 and the auxiliary switch M2 are turned off, so the ACF converter 10 does not operate.

The second delay period is for preventing the occurrence of both the main switch M1 and the auxiliary switch M2 being turned off.

The flyback controller 430 generates the auxiliary gate signal VG for controlling a switching operation of the power switch QS by using the hybrid output voltage VHO according to the backwarding signal BW of an enable level.

Figure 12:
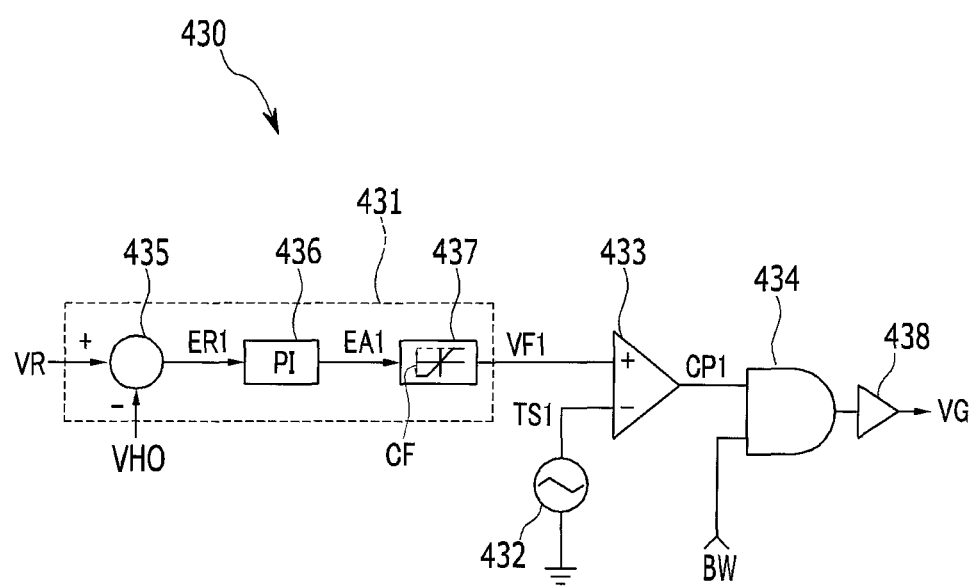
FIG. 12 is a schematic block diagram of a flyback controller 430 according to an exemplary embodiment of the present invention.

FIG. 12 is a schematic block diagram of the flyback controller 430 according to an exemplary embodiment of the present invention.

The flyback controller 430 includes a second feedback signal generation unit 431, a second PWM comparator 433, a pyramidal wave signal generation unit 432, a seventh AND gate 434, and a fifth driving unit 438.

The second feedback signal generation unit 431 compares the reference voltage and the hybrid output voltage VHO and generates a feedback signal VF2 for controlling a switching operation of the power switch QS.

The second feedback signal generation unit 431 includes an error generation unit 435, a proportion-integrating unit (PI) 436, and a clamping unit 437.

The error generation unit 435 generates an error ER1 between the reference voltage VR and the hybrid output voltage VHO.

The proportion-integrating unit (PI) 436 proportionally integrates the error ER1 to generate an error amplified signal EA1. In detail, the proportion-integrating unit (PI) 436 generates the error amplified signal EA1 by adding a value obtained by multiplying a prescribed proportion gain to the error ER1 and a value obtained by multiplying a prescribed integration gain to a result obtained by integrating the error ER1.

The clamping unit 437 generates a feedback signal VF1 by limiting a maximum and minimum value so that the error amplified signal EA1 cannot get out of a clamping range CF1.

The pyramidal wave signal generation unit 432 generates a pyramidal wave signal TS1. The pyramidal wave signal TS1 determines a switching frequency of the power switch QS.

The second PWM comparator 433 includes a non-inversion terminal (+) to which the feedback signal VF1 is inputted and an inversion terminal (−) to which the pyramidal wave signal TS1 is inputted, and when the signal inputted to the non-inversion terminal (+) is larger than the signal inputted to the inversion terminal (−), the first PWM comparator 422 generates a high level comparison signal CP1. When the signal inputted to the non-inversion terminal (+) is smaller than the signal inputted to the inversion terminal (−), the second PWM comparator 433 generates a low level comparison signal CP1.

The seventh AND gate 434 ANDs the comparison signal CP1 and the backwarding signal BW and outputs the result to the fifth driving unit 438. When the output from the seventh AND gate 434 has a high level, the fifth driving unit 438 generates an auxiliary gate signal VG for turning on the power switch QS, and when the output from the seventh AND gate 428 has a low level, the fifth driving unit 438 generates an auxiliary gate signal VG for turning off the power switch QS.

In a case in which the enable level of the backwarding signal FW according to an exemplary embodiment of the present invention is a high level, the power switch QS is turned on when the feedback signal VF1 is larger than the pyramidal wave signal TS1, and is turned off when the feedback signal VF1 is smaller than the pyramidal wave signal TS1.

When the backwarding signal BW has a low level, the power switch QS is turned off, so the flyback converter 20 does not operate.

The toggle controller 440 detects the waveform of the hybrid output voltage VHO and controls the operation of the toggle circuit 40 that generates the AC output (VAC_OUT) by using the hybrid output voltage VHO. In detail, the toggle controller 440, synchronized with a time point at which the hybrid output voltage VHO drops to become lower than a prescribed toggle reference voltage, toggles the pass gate signal PG and the flip gate signal FG for controlling the operation of the toggle circuit 30.

Figure 13:
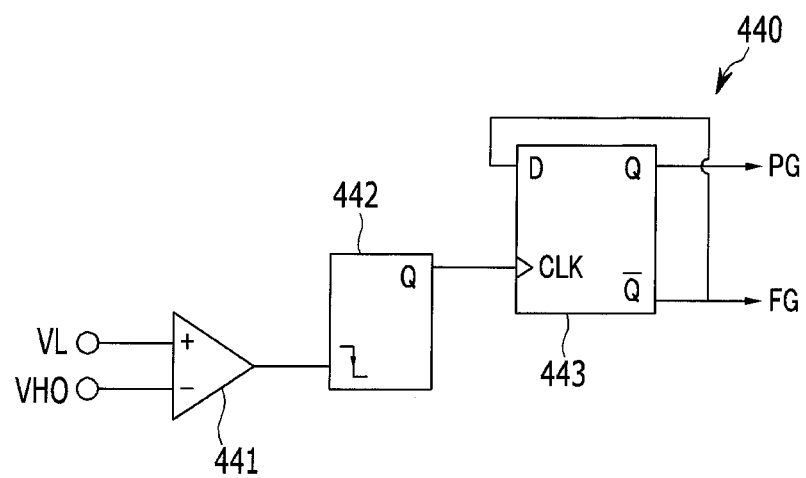
FIG. 13 is a schematic block diagram of a toggle controller 440 according to an exemplary embodiment of the present invention.

FIG. 13 is a schematic block diagram of the toggle controller 440 according to an exemplary embodiment of the present invention.

As shown in FIG. 13, the toggle controller 440 includes a toggle comparator 441, a toggle latch 442, and a D-flipflop 443.

The toggle comparator 441 includes a non-inversion terminal (+) to which the hybrid output voltage VHO is inputted and an inversion terminal (−) to which a toggle reference voltage VL is inputted, and when the signal inputted to the non-inversion terminal (+) is greater than the signal inputted to the inversion terminal (−), the toggle comparator 441 generates a high level signal. When the signal inputted to the non-inversion terminal (+) is smaller than the signal inputted to the inversion terminal (−), the toggle comparator 441 generates a low level signal.

The toggle latch 442 is synchronized with a falling edge of a signal inputted to its input terminal, and outputs a high level signal through its output terminal (Q) after the lapse of a prescribed third delay period.

The D-flipflop 443, synchronized with a rising edge of a signal inputted to its clock terminal CLK, outputs a signal inputted to its input terminal (D) through its output terminal (Q), and inverts the signal inputted to the input terminal (D) and outputs the same through the inversion output terminal (/Q). The inversion output terminal (/Q) of the D-flipflop 443 is connected to the input terminal (D).

Thus, synchronized at a time point at which the hybrid output voltage VHO drops to become lower than the toggle reference voltage VL, the output signal of the output terminal (Q) and the output signal of the inversion output terminal (/Q) of the D-flipflop 443 are toggled. The output signal of the output terminal (Q) is the pass gate signal PG, and the output signal of the inversion output terminal (/Q) is the flip gate signal FG.

In detail, the output signal of the toggle comparator 441 falls at a time point when the output voltage VHO drops to become lower than the toggle reference voltage VL. A rising edge is inputted to the clock terminal CLK of the D-flipflop 443 after the lapse of the third delay period from a time point of a falling edge of the output signal of the toggle comparator 441. When the pass gate signal PG and the flip gate signal FG have a low level and a high level, respectively, the D-flipflop 443 changes the pass gate signal PG and the flip gate signal FG to have a high level and a low level, respectively, at a time point when the rising edge is inputted to the clock terminal CLK.

With reference to FIG. 4, the time point T12 is a time point that is delayed by the third delay period starting from the time point at which the hybrid output voltage VHO drops to become lower than the toggle reference voltage VL.

In this manner, in the inverter and its driving method according to an exemplary embodiment of the present invention, the hybrid output voltage VHO having the rectified AC waveform is generated by using the ACF and the flyback converter. Thus, a switching loss generated in the related art inverter using a push-pull converter can be reduced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An inverter comprising:
   a hybrid converter generating a hybrid output voltage conforming to a rectified AC waveform according to one of a forwarding operation of delivering current from a primary side to a secondary side and a backwarding operation of delivering current from the secondary side to the primary side;
   a toggle circuit toggling the hybrid output voltage in units of one period of the hybrid output voltage to generate an AC output; and
   an inverter controller selecting one of the forwarding operation and the backwarding operation according to the hybrid output voltage, controlling a current transmission according to the selected operation, and controlling the operation of the toggle circuit,
   wherein the hybrid converter comprises an active clamp forward (ACF) converter and a flyback converter.

2. The inverter of claim 1, wherein when the ACF converter operates, the inverter performs the forwarding operation, and when the flyback converter operates, the inverter performs the backwarding operation.

3. The inverter of claim 2, wherein the inverter controller operates one of the ACF converter and the flyback converter so that the hybrid output voltage comes within a prescribed rectified AC critical range to thus conform to a rectified AC waveform, and the rectified AC critical range is set based on the rectified AC waveform.

4. The inverter of claim 3, wherein a lower limit of the rectified AC critical range is a waveform obtained by multiplying a first gain to the rectified AC waveform, an upper limit of the rectified AC critical range is a waveform obtained by multiplying a second gain to the rectified AC waveform, the second gain is greater than 1, and the first gain is smaller than 1.

5. The inverter of claim 4, wherein the inverter controller comprises a selection unit operating the ACF converter until before the hybrid output voltage, which has been reduced to the lower limit, reaches the upper limit, and operating the flyback converter until before the hybrid output voltage, which has been increased up to the upper limit, reaches the lower limit.

6. The inverter of claim 5, wherein the selection unit comprises:
   a first limit comparator comparing the hybrid output voltage and the lower limit and outputting a signal according to the comparison result;
   a second limit comparator comparing the hybrid output voltage and the upper limit and outputting a signal according to the comparison result; and
   an SR latch comprising a set terminal to which an output signal from the first limit comparator is inputted and a reset terminal to which an output signal from the second limit comparator is inputted, outputting a first level signal through a first output terminal upon being synchronized with a first edge inputted to the set terminal, and outputting a second level signal through a second output terminal upon being synchronized with a second edge inputted to the reset terminal,
   wherein a forwarding signal of an enable level for operating the ACF converter is generated according to the first level signal, and a backwarding signal of an enable level for operating the flyback converter is generated according to the second level signal.

7. The inverter of claim 6, wherein the selection unit further comprises:
   a first delay unit outputting the first level signal after the lapse of a prescribed delay period;
   a second delay unit outputting the second level signal after the lapse of the delay period;
   a first logic gate logically operating an output signal from the first delay unit and the first level signal to generate a signal for operating the ACF converter; and a second logic gate logically operating an output signal from the second delay unit and the second level signal to generate a signal for operating the flyback converter, wherein the forwarding signal for operating the ACF converter is generated according to an output signal from the first logic gate, and the backwarding signal for operating the flyback converter is generated according to an output signal from the second logic gate.

8. The inverter of claim 7, wherein the delay period is a prescribed time margin for preventing the occurrence of a case in which both the forwarding signal and the backwarding signal are in an enabled state.

9. The inverter of claim 6, wherein the ACF converter forwards the current to the secondary side by using the DC input inputted to the primary side according to the forwarding signal of the enable level.

10. The inverter of claim 9, wherein the ACF converter comprises:
a transformer comprising a primary side coil having one end to which the DC input is delivered and a secondary side coil supplying current to an output capacitor generating the hybrid output voltage;
a main switch connected to the other end of the primary side coil;
a capacitor having one end connected to the other end of the primary side coil; and
an auxiliary switch connected to the other end of the capacitor.

11. The inverter of claim 10, wherein the inverter controller comprises
an ACF controller generating a main gate signal and an auxiliary gate signal for controlling the switching operation of the main switch and the switching operation of the auxiliary switch, respectively, by using the hybrid output voltage according to the forwarding signal of the enable level.

12. The inverter of claim 11, wherein the ACF controller comprises:
a feedback signal generation unit comparing a reference voltage set to have the rectified AC waveform in synchronization with the frequency and phase of the hybrid output voltage and the hybrid output voltage to generate a feedback signal;
a pyramidal wave signal generation unit generating a pyramidal wave signal for determining a switching frequency of the main switch and that of the auxiliary switch; and
a pulse width modulation (PWM) comparator generating a comparison signal according to the result obtained by comparing the feedback signal and the pyramidal wave signal,
wherein the ACF controller generates the main gate signal of a level for turning on the main switch upon being synchronized with a first edge of the comparison signal according to the forwarding signal of the enable level, and generates the auxiliary gate signal of a level for turning on the auxiliary switch upon being synchronized with a second edge of an inverted comparison signal, which is obtained by inverting the comparison signal, according to the forwarding signal of the enable level.

13. The inverter of claim 12, wherein the ACF controller further comprises:
a first delay unit outputting the comparison signal after the lapse of a prescribed delay period, when the first edge of the comparison signal is detected;
a second delay unit outputting the inverted comparison signal after the lapse of the delay period, when the second edge of the inverted comparison signal is detected;
a first logically operating unit logically operating the comparison signal and an output signal from the first delay unit and outputting a resultant signal; and
a second logically operating unit logically operating the inverted comparison signal and an output signal from the second delay unit and outputting a resultant signal,
wherein the main gate signal is generated according to the forwarding signal of the enable level and the signal from the first logically operating unit, and the auxiliary gate signal is generated according to the forwarding signal of the enable level and the signal from the second logically operating unit.

14. The inverter of claim 9, wherein the ACF converter comprises:
a first rectifying diode having an anode electrode connected to one end of the secondary side coil;
a second rectifying diode having an anode electrode connected to the other end of the secondary side coil and a cathode electrode connected to a cathode electrode of the first rectifying diode; and
an output filter inductor having one end connected to the cathode electrode of the first rectifying diode and to the cathode electrode of the second rectifying diode and the other end connected to the output capacitor.

15. The inverter of claim 6, wherein the flyback converter sends the current to the primary side backwards by using the hybrid output voltage inputted to the secondary side according to the backwarding signal of the enable level.

16. The inverter of claim 15, wherein the flyback converter comprises:
a transformer comprising a primary side coil having one end to which the hybrid output voltage is delivered and a secondary side coil connected to the primary side; and
a power switch connected to the other end of the primary side coil.

17. The inverter of claim 16, wherein the inverter controller comprises
a flyback controller generating an auxiliary gate signal for controlling a switching operation of the power switch by using the hybrid output voltage according to the backwarding signal of the enable level.

18. The inverter of claim 17, wherein the flyback controller comprises:
a feedback signal generation unit comparing a reference voltage set to have a rectified AC waveform in synchronization with the frequency and phase of the hybrid output voltage and the hybrid output voltage to generate a feedback signal;
a pyramidal wave signal generation unit generating a pyramidal wave signal for determining a switching frequency of the power switch; and
a pulse width modulation (PWM) comparator generating a comparison signal according to the result obtained by comparing the feedback signal and the pyramidal wave signal,
wherein the auxiliary gate signal of the level for turning on the power switch is generated upon being synchronized with a first edge of the comparison signal according to the backwarding signal of the enable level.

19. The inverter of claim 1, wherein the toggle circuit toggles the hybrid output voltage in units of one period of the hybrid output voltage upon being synchronized with a first time point at which the hybrid output voltage drops to be lower than a prescribed toggle reference voltage.

20. The inverter of claim 19, wherein the inverter controller comprises a toggle controller detecting the first time point by detecting the hybrid output voltage, and toggles a pass gate signal and a flip gate signal for controlling the operation of the toggle circuit upon being synchronized with the first time point.

21. The inverter of claim 20, wherein the toggle circuit comprises:
two pass switches performing a switching operation according to the pass gate signal, respectively; and
two flip switches performing a switching operation according to the flip gate signal, respectively,
wherein when the two pass switches are turned on, the hybrid output voltage becomes the AC output, and when the two flip switches are turned on, a hybrid output voltage-inverted voltage becomes the AC output.

22. The inverter of claim 20, wherein the toggle controller comprises:
a toggle comparator comprising a first terminal to which the hybrid input voltage is inputted and a second terminal to which the toggle reference voltage is inputted, and generating a signal according to the result obtained by comparing the two signals each inputted to the first and second terminals;
a toggle latch synchronized with an edge of a signal from the toggle comparator and outputting a first level signal after the lapse of a prescribed delay period from the edge time point; and
a D-flipflop comprising an output terminal from which the pass gate signal is outputted, an inversion output terminal from which the flip gate signal is outputted, an input terminal connected to the inversion output terminal, and a clock terminal to which the output signal of the toggle latch is inputted, outputting a signal of the input terminal as the pass gate signal and inverting the pass gate signal to output it as the flip gate signal, upon being synchronized with the first level signal.

23. A method for driving an inverter including an active clamp forward (ACF) converter and a flyback converter, the method comprising:
forwarding current from a primary side to a secondary side by using the ACF converter;
backwarding current from the secondary side to the primary side by using the flyback converter; and
selecting one of the forwarding operation and the backwarding operation according to a hybrid output voltage such that the hybrid output voltage conforms to a rectified AC waveform; and detecting the waveform of the hybrid output voltage and toggling the hybrid output voltage in units of one period of the hybrid output voltage to generate an AC output.

24. The method of claim 23, wherein, in selecting one of the forwarding operation and the backwarding operation, one of the forwarding operation and the backwarding operation is selected such that the hybrid output voltage comes within a prescribed rectified AC critical range, and the rectified AC critical range is set based on the rectified AC waveform.

25. The method of claim 24, wherein a lower limit of the rectified AC critical range is a waveform obtained by multiplying a first gain to the rectified AC waveform, an upper limit of the rectified AC critical range is a waveform obtained by multiplying a second gain to the rectified AC waveform, the second gain is greater than 1, and the first gain is smaller than 1.

26. The method of claim 24, wherein the selecting of one of the forwarding operation and the backwarding operation comprises:
when the hybrid output voltage is reduced to the lower limit, selecting the forwarding operation until before the hybrid output voltage reaches the upper limit; and
when the hybrid output voltage is increased to the upper limit, selecting the backwarding operation until before the hybrid output voltage reaches the lower limit.

\* \* \* \* \*